Jan. 10, 1961 R. E. DARBO 2,967,421
FREEZING POINT DETERMINATION INSTRUMENT
Filed Jan. 31, 1956 2 Sheets-Sheet 1
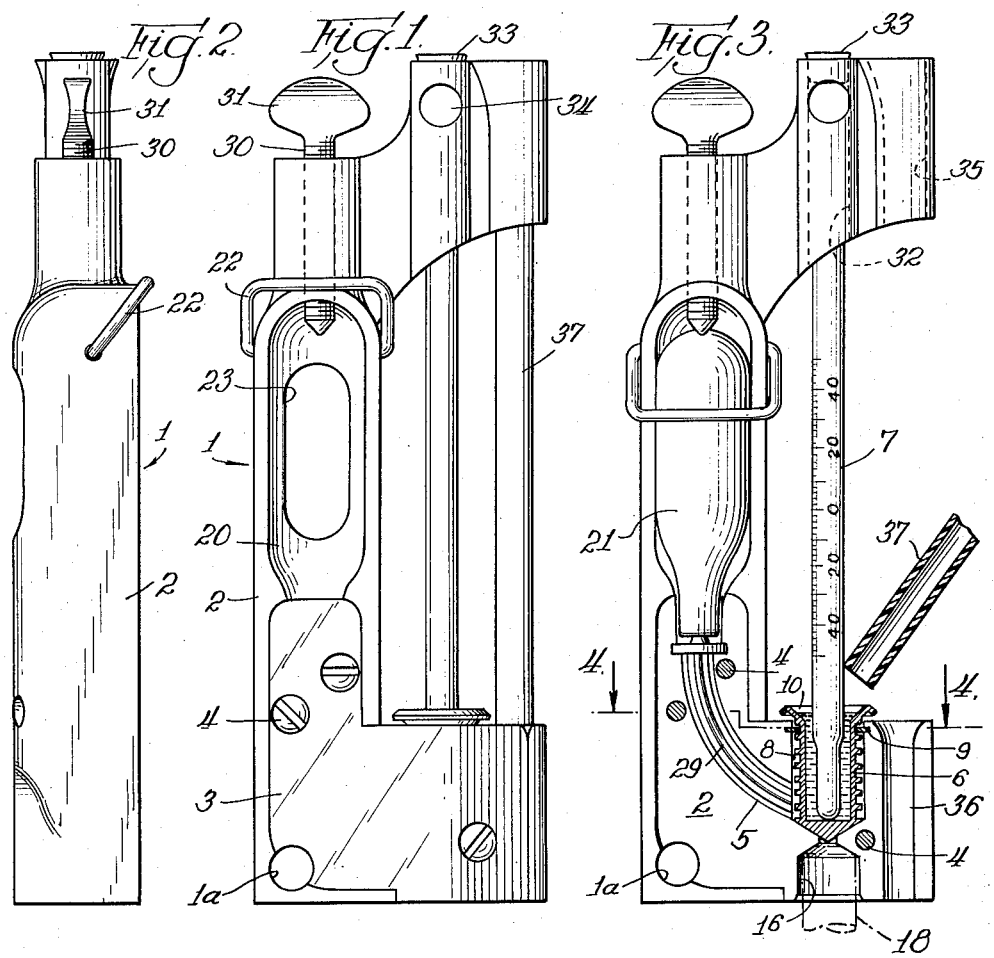
INVENTOR.
Rolf E. Darbo
BY
Jones, Tesch & Darbo Att'ys

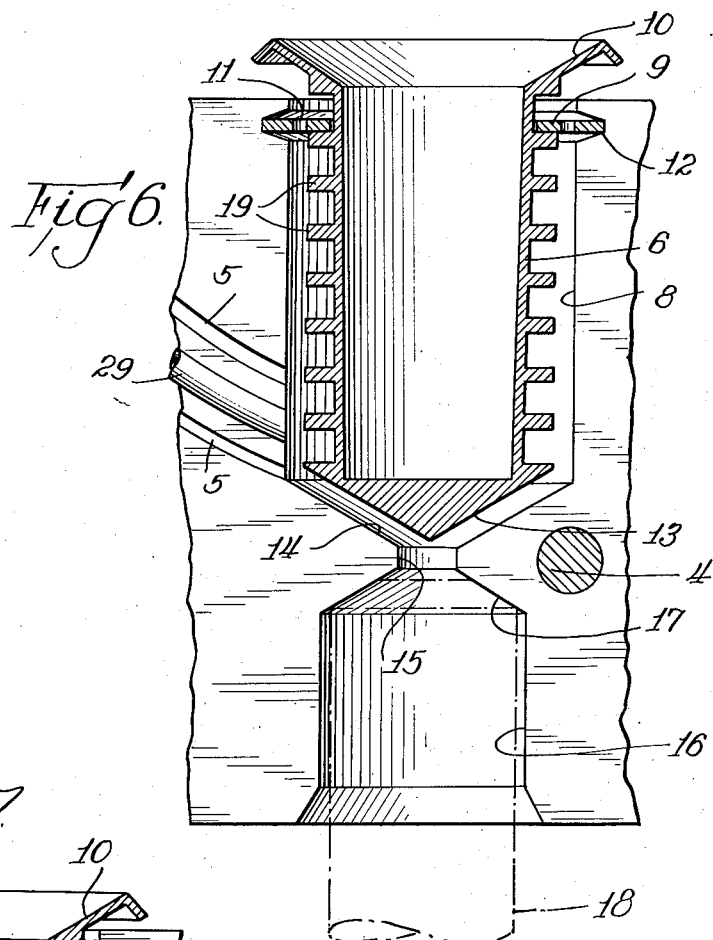
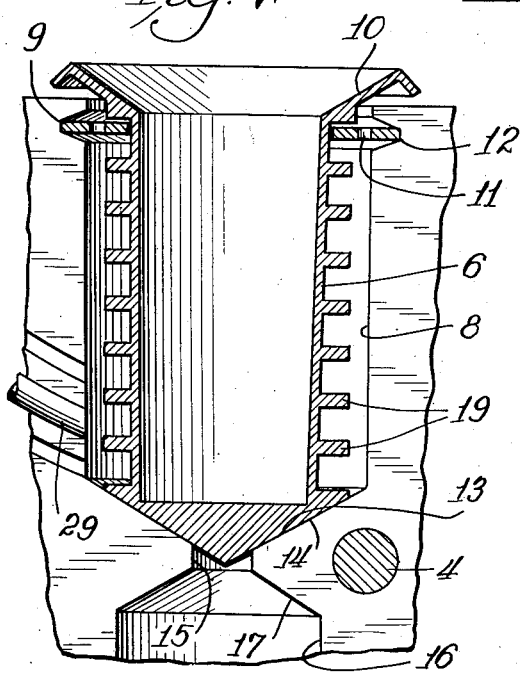

2,967,421

FREEZING POINT DETERMINATION INSTRUMENT

Rolf E. Darbo, 200 N. Prospect Ave., Madison, Wis.

Filed Jan. 31, 1956, Ser. No. 562,394

6 Claims. (Cl. 73—17)

This invention relates to temperature measuring instruments, and particularly to a device for determining the freezing points of liquids.

The freezing point of a given liquid to be used for certain purposes is frequently important in order to determine the conditions, particularly the temperature range, within which operation must be confined. If the range is too confining, the composition of the liquid may be altered to depress or elevate the freezing point, as required. For example, in the operation of liquid cooled engines, such as automotive engines, under conditions which may include temperatures below the freezing point of the water ordinarily used as a cooling medium in such engines, provision must be made to insure that the coolant will not freeze and thus prevent proper circulation within the system. This is ordinarily done by adding "anti-freeze" to the water to provide a solution that will not freeze at the lowest temperatures to be encountered. Although the proper proportions of water and alcohol, glycol, or other anti-freeze agent necessary to provide a solution having a predetermined freezing point may be determined in advance, additions of water or alcohol, to make up for evaporation, result in changes of unknown magnitude in the composition of the coolant liquid. Consequently, it is necessary, ocasionally, to redetermine the freezing point of the liquid so that additional anti-freeze can be added, if necessary.

Such determinations have customarily been made by measuring the density or specific gravity of the liquid by means of a hydrometer and determining the freezing point by reference to calibration charts or from scales shown directly upon the float of the hydrometer. Such determinations have, however, very serious limitations and, as ordinarily made, are only approximations. The hydrometer can be used for this purpose only when the anti-freeze agents contained in the solution are known. Even when known, if mixtures of two or more anti-freeze agents are included in the solution, the hydrometer reading is quite meaningless as an indication of freezing point, especially when anti-freeze agents having respective specific gravities greater and less than unity are contained in the liquid.

Freezing point information is also useful for analytical purposes, for example, in the determination of the "proof" of spirituous liquors, and, generally, in any systems for which charts showing the relationship between temperature and composition can be prepared, or where this relationship can be calculated.

The principal object of the present invention is to provide an improved instrument for the direct determination of the freezing points of liquids speedily, conveniently, inexpensively, and accurately. It contemplates a device which includes means for cooling to the freezing point and actually freezing a small sample of the liquid whereby its temperature may be read directly upon a thermometer without interpolation of any kind. A further object is to provide such an instrument which employs liquid carbon dioxide as a refrigerant and which may be used with either a small capsule of carbon dioxide as the source of refrigerant or, alternatively, with a larger storage bottle of refrigerant sufficient for a multiplicity of freezing point determinations. A further object is to provide an automatically operating valve which makes it possible to use the single form of instrument, without alteration, with the capsule or bottle source of refrigerant. Another, and an important, object of the invention is to provide novel piercing means for both starting the flow of refrigerant from the capsule and controlling the rate of flow thereof from the capsule.

The invention is completely described in conjunction with the accompanying drawings, in which Figure 1 is a front elevation of the freezing point determination instrument;

Figure 2 is a left side view of the instrument;

Figure 3 is a front view, partly in section and with a portion of the body of the instrument removed;

Figure 4 is a cross-sectional view taken at the line 4—4 of Figure 3;

Figure 5 is an enlarged, detailed sectional view showing the piercing device and illustrating its operation;

Figure 6 is an enlarged, detailed view showing the specimen thimble lifted from its seat to provide a refrigerant inlet passageway at the bottom of the refrigerant expansion well, and Figure 7 is an enlarged, detailed view, similar to that of Fig. 6, but showing the specimen thimble seated to close said passageway.

The body 1 of the instrument may be constructed from any suitable rigid material which is thermally insulating and not unduly affected by the changes in temperature to which certain parts are necessarily subjected in the use of the instrument. The body may be formed from a suitable plastic material, which may advantageously be transparent, and is shown to consist of a principal body part 2 and an insert part 3 which is fastened to the principal body part 2 by suitable means, such as screw assemblies 4, and serves to retain the several internal parts of the instrument in proper position in the instrument. Suitable cavities are provided for the reception of these internal parts and mating grooves and beads 5 are included to fix, along with other external surfaces of the body parts, the mating sections in proper relation to each other. A hole 1a is provided for hanging the instrument from a suitable peg or hook when not in use.

A thimble 6, sufficiently large to contain a small specimen of the liquid of which the freezing point is to be determined and the bulb of thermometer 7, and made from a suitable corrosion-resisting heat conductive metal, is retained without refrigerant expansion well 8 in the instrument body by means of a washer 9 which encircles the body of thimble 6 with sufficient clearance to permit the thimble to move up and down between certain limits. The thimble is preferably provided with a sloping annular flange 10 at its open top as a funnel leading into the container portion of the thimble. Washer 9 is provided with a series of very small perforations 11 intended to perform the double function of permitting the escape of the refrigerant gas from the refrigerant expansion well 8 while straining out and holding back the solid refrigerant "snow," all as hereinafter more fully described. If the funnel flange 10 is an integral part of the thimble structure, washer 9 consists of two halves which are applied as a collar around the thimble and held in proper position by means of circumferential grooves 12 in the body structure near the open top of the well.

The exterior of the bottom of thimble 6 is conical to form a valve plug 13 adapted to seat upon the conical bottom 14 of the refrigerant expansion well to close refrigerant inlet passageway 15 under certain conditions. A cylindrical cavity 16 is provided in the body of the instrument for entry of the outlet nozzle 18, indicated by dash-dot lines, of a carbon dioxide bottle, the top 17 of this cavity being conical in shape to serve as a sealing surface against which the tip of the nozzle can be pressed to minimize the escape of refrigerant at this point and guide it through passageway 15 and into expansion well 8.

The body of thimble 6 is preferably thin-walled, as shown, to facilitate the transfer of heat between specimen and refrigerant and is also preferably provided with a series of spaced circumferential fins 19 to increase the amount of heat exchange surface exposed to the refrigerant.

A recess 20 is provided in the body of the instrument for the reception of a carbon dioxide capsule 21, and a bail latch 22 is pivoted in the body to prevent accidental jet-propelled projection of a partly discharged capsule from recess 20. An opening 23 permits entry of a finger to assist in the removal of an exhausted capsule.

A puncturing nib 24 in the form of a conical projection from an integral base supporting plate 25 is securely mounted in a cavity provided for that purpose in parts 2 and 3 of the body of the instrument. A passageway 26 extends axially through the base and conical nib toward its apex and connects with a short duct 27 which opens at a conical surface of the nib near the apex thereof. Desirably, the apex point of the conical nib is ground down somewhat to a flat surface 24a, inclined to the axis of the nib and providing a curved shear edge at the intersection of the flat and conical surfaces. Duct 27, which should be very small, is normal to the conical surface of the nib 24 and preferably opens directly below the highest part of this shear edge. This arrangement results in the smallest possible opening at the conical surface and thus minimizes the likelihood of escape of refrigerant through an uncovered lower portion of the opening. It permits exposure of the duct opening to the interior of the capsule for the discharge of liquid carbon dioxide upon minimum continued movement after the initial shearing of capsule closure 28. The portions of capsule closure 28 sheared by the curved shearing edges form better seals with the conical nib surfaces than torn edges resulting from point piercing and rupture stretching.

If desired, a capillary tube 29 may be inserted into nib base 25 to connect passageway 26 with refrigerant expansion well 8. This tube may be dispensed with if the body parts 2 and 3 of instrument body 1 are made sufficiently accurately to form a reasonably tight conduit to conduct the carbon dioxide to the expansion well. Mating beads and grooves 5 may be used to prevent lateral escape of refrigerant when the separate tube is not used.

A thumb screw ram 30 having a suitable head 31 for hand manipulation is arranged in a correspondingly threaded bore having its axis slightly toward the front of the instrument from the axis of the carbon dioxide capsule to hold the capsule firmly against the back wall of the capsule cavity.

Thermometer 7 is inserted through a bore 32 opening at the top of the instrument body and plugged by a removable stopper 33 after insertion of the thermometer. A hole 34 is provided to give access to the plug for removing the same in the event that the thermometer must be replaced. Bores 35 and 36 offer a sheath for the reception and frictional holding of a suitable open ended length of tubing 37 which, when in sheathed position, protects the thermometer and may be used as a pipette for the withdrawal of a liquid specimen from the automotive engine radiator or other liquid container.

To use the instrument for a single isolated determination of the freezing point of a given liquid, a sample of the liquid in sufficient quantity to substantially fill thimble 6 is taken by means of the sampling tube 37 and run into the thimble, as indicated in Fig. 3. A charged carbon dioxide capsule is inserted into recess 20, latch 22 lowered into position, and thumb screw 30 turned downwardly to ram the capsule onto piercing nib 24. Manipulation of the thumb screw can be controlled to permit discharge of the carbon dioxide liquid at the rate that a small amount of experience with use of the instrument will show to be most desirable. The particular construction of the piercing nib makes close control possible. As is shown in Fig. 5, capsule closure 28 slides down along the surfaces of the top portion of the nib as the capsule is forced downwardly by manipulation of thumb screw 30 and following shearing of the closure by the forward edge of the nib. Leakage of the carbon dioxide is prevented by the pressure engagement of the closure metal with the surface of the nib. As the capsule is pushed down, the sheared edge of the closure moves to the point at which the opening of duct 27 is exposed, first for very slight passage of liquid carbon dioxide and then, as the capsule is moved progressively farther downwardly, for greater exposure and flow of carbon dioxide into the duct 27 and passageway 26. The rate of flow of refrigerant may be fixed at any desired rate by discontinuing turning of the screw ram 30.

Liquid carbon dioxide, so flowing at a controlled rate from the capsule, expands into expansion well 8, forming snow upon the external surfaces of thimble 6 and further expanding and escaping as a gas through perforations 11. Escape of the refrigerant through passageway 15 at the bottom of the well is prevented by the thimble itself which, under the influence of gravity, is seated upon the conical surface 14 to serve as a check valve at this point. Expansion of the carbon dioxide and change in state of this refrigerant results in the rapid absorption of heat from the specimen within the thimble and the temperature of the specimen is registered by the thermometer and can be read as the liquid begins to show signs of freezing. Carbon dioxide snow resting upon fins 19 remains in intimate heat exchange contact as the layer adjacent the warmer surface sublimes. Following freezing of the specimen and sublimation and expansion of the carbon dioxide, the thimble and its contents reabsorb heat from their surroundings and, as the frozen specimen melts, a check of the freezing point may be made. The temperature lingers momentarily at the freezing point as the specimen is being frozen, and again as it is being thawed, due to the heat interchange involved in the change in state of the mass. Reading of the freezing point temperature with a high degree of accuracy is thus facilitated.

If a series of freezing point determinations are to be made, as, for example, in the testing of the anti-freeze solutions in the radiators of automobiles by garages and service stations, it is more economical to use a bulk source of carbon dioxide, such as the bottles used in carbon dioxide fire extinguishers, as a refrigerant. A suitable nozzle, such as nozzle 18 shown in dash-dot lines in Figs. 3 and 6, is attached to the discharge of the valve of the carbon dioxide bottle, and the instrument is pressed down and held tightly against the nozzle while the valve of the refrigerant bottle is opened and the desired quantity of refrigerant is permitted to pass from the bottle, through passageway 15 and into the refrigerant expansion well 8. The pressure of the carbon dioxide causes the entire thimble body to lift until the annular bead 38, serving as a stop fixed to thimble 6, engages washer 9 to permit flow of the refrigerant into the expansion well and around the thimble body to exert its refrigerating effect in the manner above described. If the instrument body is transparent, the existence of snow in the expansion well may be visually determined and the necessity of furnishing additional refrigerant judged. Consumption of refrigerant and the time required for the entire determination can be controlled to the best advantage when the instrument is used with a valve-equipped refrigerant container.

It will be understood that the instrument herein described is not only capable of making accurate freezing point determinations, but may also be used for determining the cloud point of certain solutions or mixtures and for other purposes which require the cooling of a small specimen.

Invention is claimed as follows:

1. In a freezing point determination instrument including a body having a vertical open-topped well therein, a specimen thimble within said well and supported from said body for limited vertical movement between a position resting upon the bottom of said well and a raised position providing clearance between the bottom of said thimble and the bottom of said well, a first refrigerant inlet duct opening into said well at a side thereof, a second refrigerant inlet duct opening into said well at substantially the center of the bottom thereof, the bottom of said thimble and the bottom of said well having mating valving surfaces and forming a check valve normally closing said second inlet duct and opening upon upward movement of the thimble produced by the introduction of refrigerant under pressure to said second inlet duct.

2. In a freezing point determination instrument including a body having a vertical open-topped well therein, a specimen thimble within said well and supported from said body for limited vertical movement between a position resting upon the bottom of said well and a raised position providing clearance between the bottom of said thimble and the bottom of said well, a first refrigerant inlet duct opening into said well at substantially the center of the bottom thereof, the bottom of said thimble and the bottom of said well having conical mating valving surfaces and forming a check valve normally closing said second inlet duct and opening upon upward movement of the thimble produced by the introduction of refrigerant under pressure to said second inlet duct.

3. A freezing point determination instrument comprising a body having a vertical open-topped well therein, a specimen thimble arranged in said well, a combined refrigerant capsule piercing and flowrate regulating device mounted in said body and facing upwardly, said device comprising an upwardly pointing conical nib whereof the apex terminal is a flat inclined surface forming a curved shearing edge at the intersection of said flat surface with the conical surface of said nib, said nib having a passageway extending upwardly therein and terminating at a single opening in the conical surface thereof just below the highest portion of said shearing edge.

4. A freezing point determination instrument comprising a body having a vertical open-topped well therein, a specimen thimble arranged in said well, a combined refrigerant capsule piercing and flowrate regulating device mounted in said body and facing upwardly, means for connecting said device with said well, said body having a passageway at the center of the bottom of said well opening downwardly into an exposed nozzle seat, the bottom of said well and the outside of the bottom of said thimble being conical and said thimble being axially movable within the said well, whereby said thimble is adapted to co-act with the conical bottom of said well to form a check valve controlling said passageway, and means for ramming a refrigerant capsule downwardly upon said piercing and regulating device to cause refrigerant to flow from the capsule to said well at a predetermined rate.

5. Structure in accordance with claim 4 and including a washer mounted in the body of the instrument and loosely encircling the thimble near the top thereof to support the same, and a circumferential bead fixed to said thimble and spaced below said washer in the normal position of said thimble to co-act with said washer in limiting the upward of said thimble.

6. A device for piercing and regulating the rate of flow of refrigerant from a refrigerant capsule comprising a conical nib whereof the apex extremity is a flat inclined surface forming a curved shearing edge at the intersection of said flat surface with the conical surface of said nib, said nib having a passageway extending axially therein toward the apex of said nib and terminating at a single opening in the conical surface just below the portion of the shearing edge which is farthest from the base of said nib.

References Cited in the file of this patent

UNITED STATES PATENTS

| | | |
|---|---|---|
| 1,263,278 | Parker | Apr. 16, 1918 |
| 2,158,347 | Yirava | May 16, 1939 |
| 2,336,708 | Ward | Dec. 14, 1943 |
| 2,658,383 | Chipley | Nov. 10, 1953 |

UNITED STATES PATENT OFFICE
CERTIFICATION OF CORRECTION

Patent No. 2,967,421                      January 10, 1961

Rolf E. Darbo

It is hereby certified that error appears in the above numbered patent requiring correction and that the said Letters Patent should read as corrected below.

Column 2, line 51, for "without" read -- within --; column 6, line 26, insert "movement" before "of said thimble".

Signed and sealed this 30th day of May 1961.

(SEAL)
Attest:

ERNEST W. SWIDER
Attesting Officer

DAVID L. LADD
Commissioner of Patents